United States Patent [19]

Kain

[11] 4,453,815

[45] Jun. 12, 1984

[54] CAMERA HAVING A REMOTE CONTROL SHUTTER RELEASE ASSEMBLY

[76] Inventor: Robert W. Kain, 405 Miami Ave., Terrace Park, Ohio 45174

[21] Appl. No.: 358,595

[22] Filed: Mar. 16, 1982

[51] Int. Cl.³ .......................................... G03B 17/38
[52] U.S. Cl. .................................................. 354/269
[58] Field of Search ................ 354/266, 269; 352/179

[56] References Cited

U.S. PATENT DOCUMENTS

| | | | |
|---|---|---|---|
| 1,805,185 | 5/1931 | Ramsey | 354/269 |
| 2,650,501 | 9/1953 | Murray | 352/179 |
| 2,874,625 | 2/1959 | Thalhammer | 354/266 |

FOREIGN PATENT DOCUMENTS 27270 of 1914 United Kingdom ................ 354/266

Primary Examiner—A. A. Mathews
Attorney, Agent, or Firm—James W. Pearce; Roy F. Schaeperklaus

[57] ABSTRACT

A shutter release assembly for a camera having a body and a push button release slideably mounted on the body. The shutter release assembly includes a piston and a piston rod member mounted on the body. A cylinder is slideably mounted on the piston. The cylinder is connected to the push button. Fluid under pressure is supplied to the cylinder to cause movement of the push button in a direction to cause shutter release of the camera.

4 Claims, 9 Drawing Figures

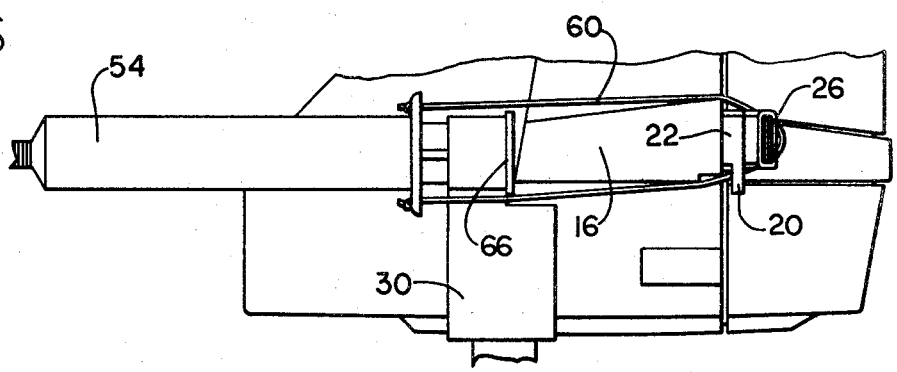
FIG. 6
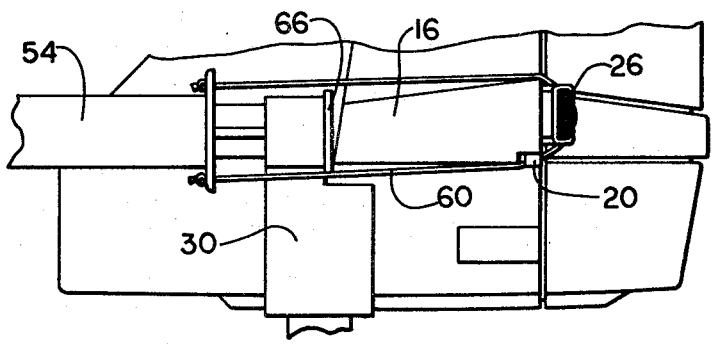
FIG. 7
FIG. 8
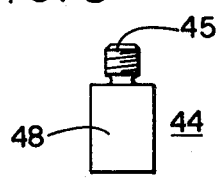
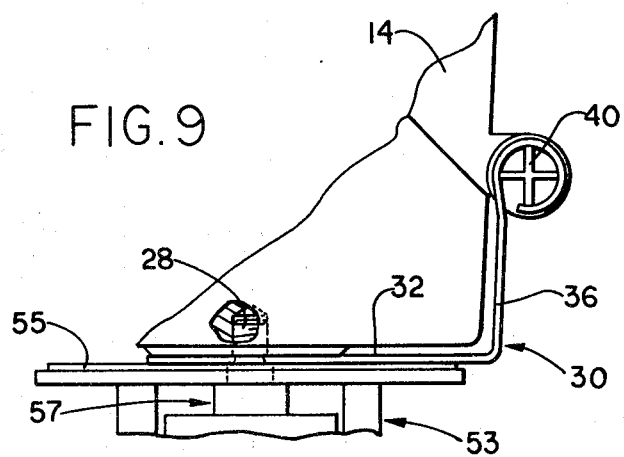
FIG. 9

CAMERA HAVING A REMOTE CONTROL SHUTTER RELEASE ASSEMBLY

This invention relates to a shutter release for a camera. More particularly, this invention relates to a removable bulb operated shutter release.

An object of this invention is to provide a shutter release which can be removably mounted on a tripod mount of a camera.

A further object of this invention is to provide a shutter release which includes a piston and rod assembly which is mounted on the camera and a cylinder which is movable when a pressure bulb is actuated to operate shutter release mechanism of the camera.

A further object of this invention is to provide such a shutter release in which the cylinder is connected to actuate a shutter release button of the camera when the cylinder is moved by actuation of the pressure bulb.

Briefly, this invention provides a shutter release for a camera which includes a bracket that is mounted on a tripod mount of the camera, a piston and rod assembly which is mounted on the bracket, and a cylinder which is movable along the rod assembly. The cylinder surrounds the piston. A pressure bulb is connected to the cylinder to cause advance of the cylinder along the rod when the bulb is actuated. The cylinder is connected to shutter release button means of the camera and is arranged to advance the shutter release button means when the cylinder is pressurized.

The above and other objects and features of the invention will be apparent to those skilled in the art to which this invention pertains from the following detailed description and the drawings, in which:

FIG. 6 is a fragmentary view in side elevation of the camera and shutter release assembly in a mid-position;

FIG. 7 is a view in side elevation of the camera and the shutter release assembly in fully released position;

FIG. 8 is a view in side elevation of a mounting fitting of the assembly; and

FIG. 9 is a view in section taken on the same line as FIG. 4, but showing the camera mounted on a tripod.

In the following detailed description and the drawings, like reference characters indicate like parts.

Figure 1:
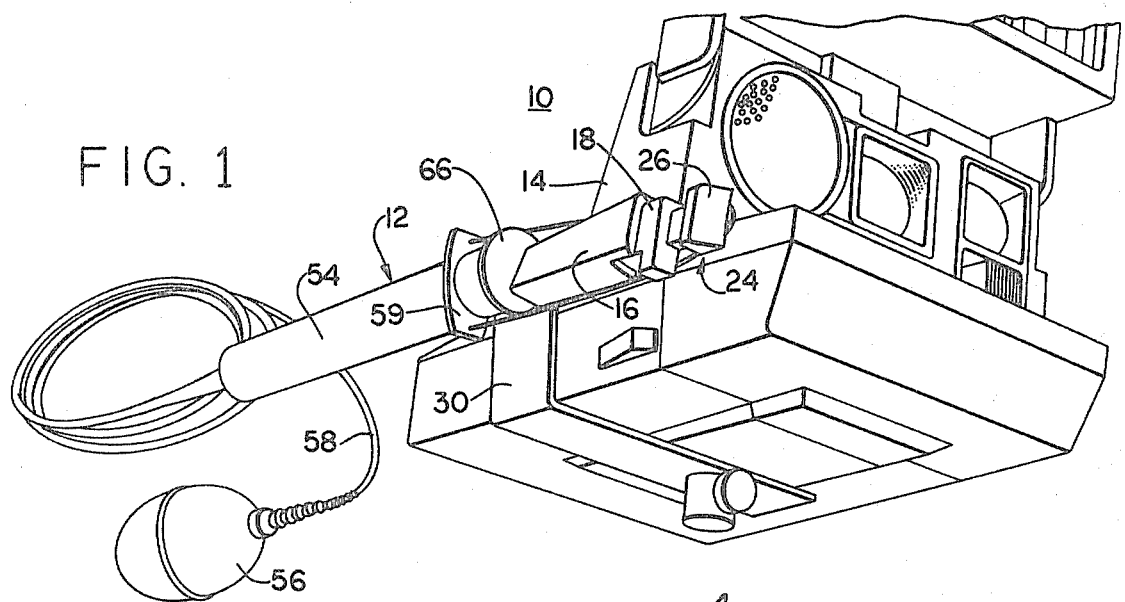
FIG. 1 is a perspective view of a camera equipped with a shutter release assembly constructed in accordance with an embodiment of this invention.
Figure 2:
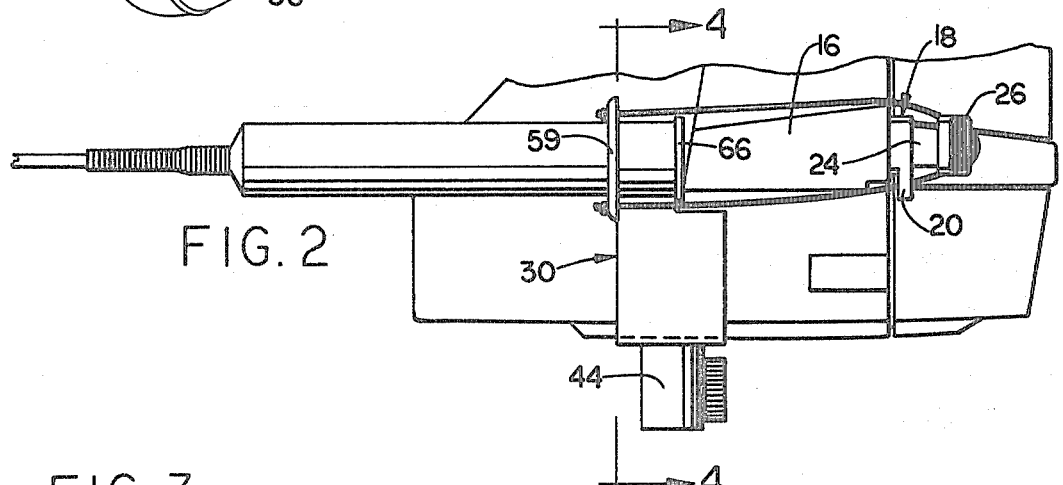
FIG. 2 is a view in side elevation of the camera and the shutter release assembly shown in FIG. 1, the shutter release assembly being shown in released position.
Figure 3:
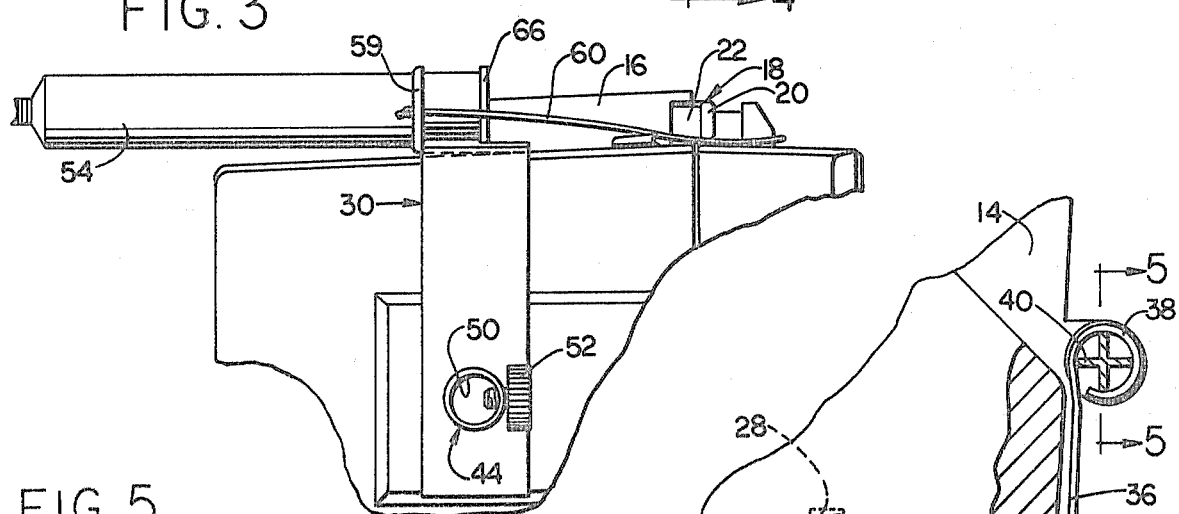
FIG. 3 is a fragmentary bottom plan view of the camera and the shutter release assembly.
Figure 4:
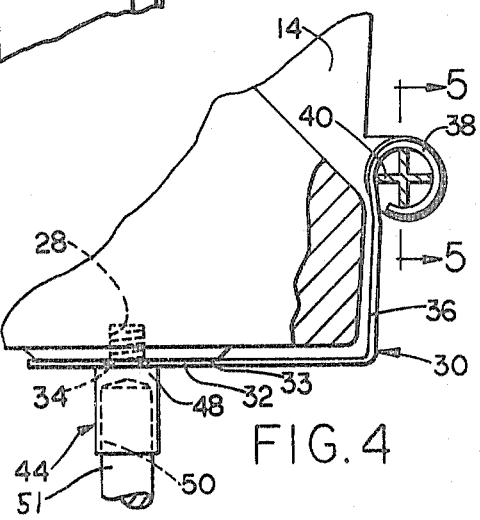
FIG. 4 is a view in section taken generally on the line 4—4 in FIG. 2.
Figure 5:
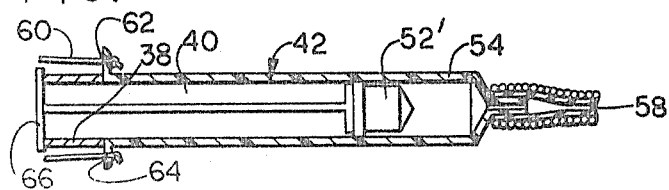
FIG. 5 is a view in section taken on the line 5—5 in FIG. 4.

In FIG. 1 is shown a camera 10 on which is mounted a shutter release assembly 12 constructed in accordance with an embodiment of this invention. The camera 10 includes a body 14 on which is mounted a boss 16. A hollow first plunger 18 having a head 20 and a stem 22 is slideably mounted in the boss 16. A second plunger or push button shutter release 24 having a head 26 is slideably mounted in the hollow plunger 18 with the head 26 of the second plunger being engageable with the head 20 of the hollow plunger 18 when the second plunger 24 is advanced to the left as shown in FIGS. 2, 6 and 7 during operation of the camera 10. The second plunger 24 can operate electrical circuitry of the camera 10 (not shown) to preset the camera for shutter release. The hollow plunger can operate shutter release mechanism (not shown) of the camera. The camera can be of the type shown as a Polaroid Autofocus 660, or a camera of similar operation. The camera includes an internally threaded socket 28 in a lower face 30 of the body 14, as shown in FIG. 4 for a tripod mount.

The shutter release assembly 12 includes a support bracket 30. A plate portion 32 of the bracket 30 can underlie a lower face 33 of the body 14 which an opening 34 in the plate portion 32 underlying the threaded socket 28. An upright flange 36 of the support bracket 30 extends upwardly along a side of the camera and terminates in a loop portion 38. The loop portion 38 is mounted on a stem portion 40 of a piston rod member 42. The stem portion 40 can be of cross shape in cross section as shown in FIG. 4. A mounting fitting 44 can be used to attach the camera body to the plate portion 32 of the support bracket 30. The mounting fitting 44 includes an externally threaded portion 45, which is received in the threaded socket 28, and a body 48, which engages the plate portion 32 of the support bracket 30. A socket 50 is formed in the body 48 of the mounting fitting 44 for receiving a mounting lug of an illuminating unit 51. A screw fitting 52 is threaded in a wall of the socket 50 for holding the mounting lug. Alternatively, the camera body 14 can be mounted on a tripod 53, only a portion of which is shown in FIG. 9, with head 55 of the tripod holding the plate portion 32 of the bracket 30 against the bottom of the body 14 and a threaded lug 57 of the tripod received in the socket 28 of the camera body.

A piston member 52' is mounted on the stem portion 40 of the piston rod member 42. A reciprocating cylinder 54 is slideably mounted on the piston member 52. The cylinder 54 can be pressurized by means of a bulb 56 and a pressure tube 58 connecting the bulb 56 to the cylinder 54. An annular flange 59 on the cylinder 54 carries end portions of a cord 60. The end portions of the cord 60 extend through openings 62 and 64 in the flange 59 at opposite ends of a diameter thereof. The end portions of the cord 60 are knotted as shown to prevent withdrawal thereof. The cord 60 forms a loop around the head 26 of the second plunger 24. A head 66 on the piston rod member 42 engages the boss 16. When the reciprocating cylinder 54 is pressurized, the cylinder 54 moves away from the boss 16 and to the left as shown in FIGS. 6 and 7, and the cord 60 first draws the head 26 of the second plunger 24 to the position shown in FIG. 6 at which the electronic circuits of the camera are set in condition for shutter release. Then, as the cylinder 54 is further pressurized, the cylinder 54 and the cord 60 move further to the left as shown in FIG. 7, and the cord 60 draws the second plunger 24 together with the hollow plunger 18 to the position at which the head 20 of the hollow plunger 18 is shown in FIG. 7 at which the shutter of the camera is released and a picture is taken.

The shutter release arrangement illustrated in the drawings and described above is subject to structural modification without departing from the spirit and scope of the appended claims.

Having described my invention, what I claim as new and desire to secure by Letters Patent is:

1. The combination of a camera which includes a body and a push button shutter release means slideably mounted on the body, a piston rod member mounted on the body and carrying a piston member, a cylinder slideably mounted on the piston member, means connecting the cylinder to the push button shutter release means, and means for supplying fluid under pressure to the cylinder to cause movement of the push button in a direction to cause shutter release of the camera.

2. A combination as in claim 1 in which the cylinder carries an outwardly extending flange and the means for connecting the cylinder to the push button includes a cord mounted on the push button with end portions of the cord extending through and anchored at openings in the flange of the cylinder.

3. A combination as in claim 2 in which the openings in the flange are disposed at opposite ends of a diameter of the cylinder.

4. The combination of a camera which includes a body, a control boss mounted on the body, and a push button shutter release means slideably mounted in the boss, there being a tripod mount in the body with a bracket releasably mounted on the tripod mount, a piston rod member mounted on the bracket and engageable with the boss, a piston member carried by the piston rod member, a cylinder slideably mounted on the piston rod member, cord means anchored on the cylinder and bearing on the push button shutter release means, and means for supplying fluid under pressure to the cylinder to cause movement of the push button shutter release means in a direction to cause shutter release of the camera.

* * * * *